May 16, 1933.  J. L. DRAKE  1,908,825
APPARATUS FOR FORMING SHEET OR PLATE GLASS
Filed Oct. 11, 1928  2 Sheets-Sheet 1
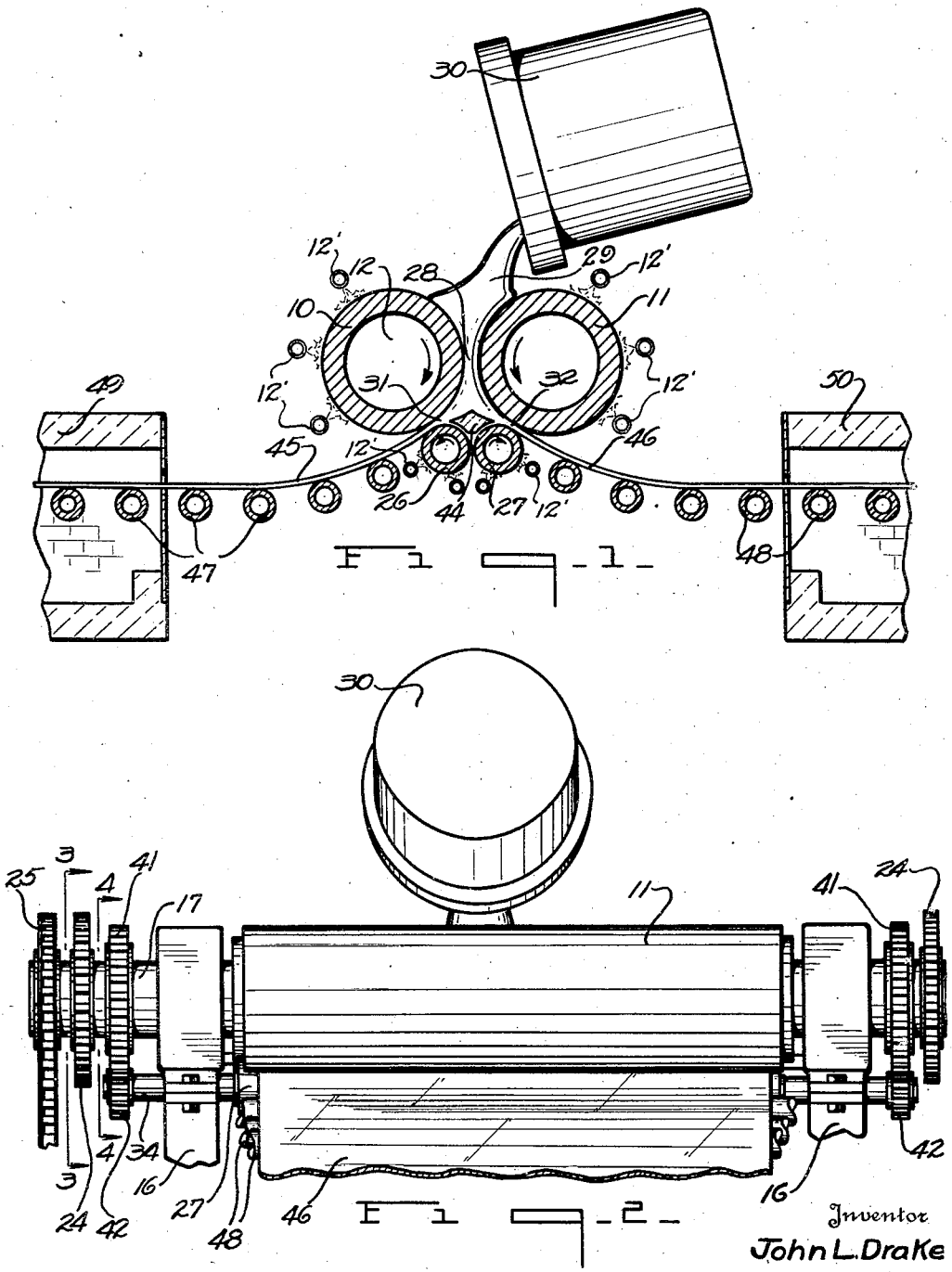
Inventor
John L. Drake
By Frank Fraser,
Attorney May 16, 1933.   J. L. DRAKE   1,908,825
APPARATUS FOR FORMING SHEET OR PLATE GLASS
Filed Oct. 11, 1928   2 Sheets-Sheet 2
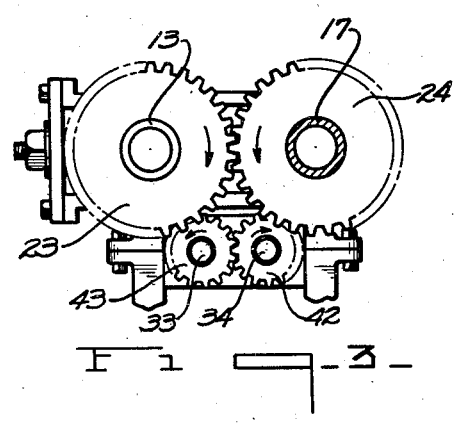
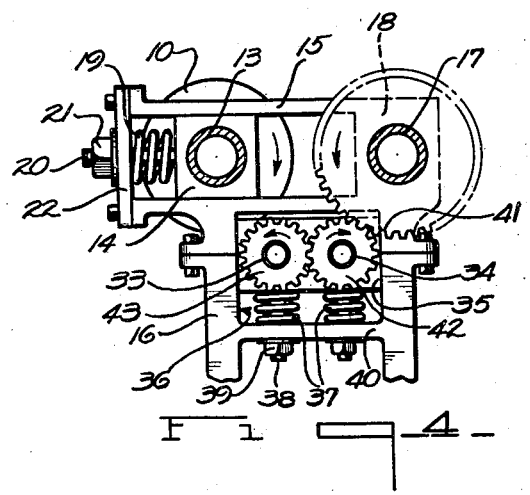
Inventor
John L. Drake
By Frank Fraser,
Attorney Patented May 16, 1933

1,908,825

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

APPARATUS FOR FORMING SHEET OR PLATE GLASS

Application filed October 11, 1928. Serial No. 311,758.

This invention relates to improvements in methods and apparatus for forming sheet or plate glass.

An important object of the present invention is the provision of an improved method of and apparatus for facilitating, expediting and improving generally the simultaneous formation of a plurality of sheets of glass from a common source of supply and further, for conditioning the glass prior to its being reduced to sheet form whereby the resultant sheets produced will be of an improved quality. The invention contemplates the provision of means for simultaneously producing a plurality of sheets and for treating opposite surfaces of the mass or body of glass going to make up the sheets in the same manner in order that undue and ununiform chilling of the glass may be avoided to the end that the glass, when introduced into the sheets, will be of a more uniform temperature. Uneven chilling of the glass body prior to its being reduced to sheet form is undesirable since the cold particles of glass mixing with the hotter particles tend to create defects in the finished product.

Another object of the invention is to provide in glass forming apparatus, a plurality of rotary members associated with one another to form a pocket for receiving therein a mass or body of molten glass, said members being rotatable in such a manner as to treat opposite surfaces of the glass body in the same manner and to subsequently form the glass into a plurality of sheets.

Another object of the invention resides in the utilization of sheet forming means wherein a plurality of rotary members are arranged relative to one another to form a pocket and a plurality of sheet forming passes, a supply of molten glass being delivered to the pocket and the rotary members being actuated in such a manner as to feed the glass simultaneously to the sheet forming passes, said rotary members also serving to maintain that portion of the glass in contact therewith continuously in motion whereby to prevent uneven chilling of said glass.

A further object of the invention is the provision of sheet glass apparatus embodying two pairs of rotary members, each pair of members being arranged to create a sheet forming pass and the two pairs of members together forming a pocket wherein a mass or body of molten glass is deposited to form a sheet source and which molten glass is adapted to be supplied simultaneously to the two sheet forming passes to form two sheets of glass.

The invention further includes novel means for mounting the rotary members with respect to one another and for driving the same. Also, means for directing the molten glass in equal volume to the sheet forming passes.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through glass forming apparatus provided by the present invention.

Fig. 2 is a view taken at substantially right-angles to Fig. 1, the burners having been omitted for the sake of clearness.

Fig. 3 is a transverse section taken substantially on line 3—3 of Fig. 2, and

Fig. 4 is a transverse section taken substantially on line 4—4 of Fig. 2.

Referring more particularly to the drawings, the sheet or plate glass forming apparatus herein provided comprises a pair of relatively large rotary members or rolls 10 and 11 arranged side by side in substantial horizontal alignment and spaced from one another as illustrated in Fig. 1. Each of the rolls 10 and 11 may be provided with a longitudinally extending internal bore or passage 12 to permit the circulation of a suitable cooling medium therethrough while the outer surfaces of said rolls may be heated by a plurality of burners 12' or by any other preferred means. The roll 10 is preferably reduced somewhat in diameter at the opposite ends thereof as indicated at 13, each reduced end being journaled in a bearing member 14 slidably mounted for horizontal adjustment within a horizontal guideway 15 carried upon the top of the supporting standard 16.

The opposite ends of the roll 11 are likewise preferably reduced in diameter as indicated at 17, each reduced end being journaled in a fixed bearing part 18 formed integral with or separate from the guideway 15. Thus, the roll 11 is stationary while the roll 10 is adjustable toward and away therefrom. The roll 10 is yieldably urged toward the roll 11 by means of compression springs 19, the limit of inward movement of the roll 11 being determined by the bolt 20 and nut 21. The bolt 20 is carried at its inner end by the respective bearing member 14 and projects outwardly through the part 22 of the guideway 15 and has the nut 21 threaded upon its outer end.

Carried by the reduced ends 13 and 17 of the rolls 10 and 11 are gears 23 and 24 arranged in constant mesh with one another. The reduced end 17 of roll 11 projects outwardly beyond the gears and is positively driven from any suitable source of power and in any desired manner such as by means of a sprocket and chain connection 25. Upon rotation of the roll 11, the roll 10 will be driven therefrom and in the opposite direction through the intermeshing gears 23 and 24.

Mounted beneath the rolls 10 and 11 are the relatively smaller rotary members or rolls 26 and 27. These latter rolls are arranged relatively closer together than are the rolls 10 and 11 and the said rolls 26 and 27 are associated therewith in a manner to form a pocket 28 for receiving therein a body or mass of molten glass 29 from a pot or other receptacle 30. Thus, it might be said that the rolls 26 and 27 constitute the bottom of the pocket while the rolls 10 and 11 form the sides thereof. The rolls 26 and 27 also cooperate respectively with the rolls 10 and 11 to create the two sheet forming passes 31 and 32, the width of these passes determining the thickness of sheets produced. Each of the forming rolls 26 and 27 is also preferably provided with an internal bore or passage 12 through which a cooling medium may be circulated while the temperature of the outer surfaces of said rolls may also be controlled by means of burners or the like 12'.

The opposite ends of the forming rolls 26 and 27 are also preferably reduced in diameter as indicated at 33 and 34 respectively, the opposite reduced ends of these rolls being journaled in a bearing block 35 mounted for vertical movement within an opening or slideway 36 formed in the supporting member 16. The rolls 26 and 27 are normally urged upwardly toward the rolls 10 and 11 by means of compression springs 37, the upward movement being limited by bolts 38 and nuts 39. The bolts 38 are carried by the bearing block 35 and project downwardly through the horizontal part 40 of the support 16. The nuts 39 are threaded upon the outer ends of the bolts and bear against the part 40.

Carried by the reduced end 17 of roll 11 outwardly of the gear 24 is a gear 41 adapted to mesh with a gear 42 keyed to the reduced end 34 of roll 27 and which gear 42 meshes with a gear 43 mounted upon the reduced end 33 of roll 26. With the arrangement above described and upon positive rotation of the roll 11, the several rolls will be driven in the directions indicated by the arrows in Fig. 1. That is, as the roll 11 is positively driven, the roll 10 will be driven in the opposite direction through the intermeshing gears 23 and 24. The gear 41 on roll 11 meshing with the gear 42 will rotate the forming roll 27 in a direction opposite to the direction of rotation of the roll 11 and the gear 42 meshing with the gear 43 will drive the forming roll 26 in a direction opposite to the direction of rotation of both the roll 10 and roll 27. In this manner, the rolls 10 and 26 will be driven in opposite directions to advance the molten glass through the sheet forming pass 31 and the rolls 11 and 27 will likewise be driven in opposite directions to advance the molten glass through the sheet forming pass 32.

If desired, the several rolls can be of such a size and so arranged relative to one another that the forming rolls 26 and 27 are in contact with each other to prevent molten glass from passing downwardly therebetween. However, as herein illustrated, a fixed bar 44, carried by the supports 16, may be arranged above and between the forming rolls 26 and 27 to prevent the molten glass from passing downwardly therebetween. This bar also serves the function of a directing member for directing the glass to the sheet forming passes 31 and 32. As shown, the upper surface of the bar may be raised at its transverse center and then sloped downwardly to its opposite longitudinal edges so as to direct the molten glass in equal amounts or volume to the sheet forming passes. The member 44 therefore functions to divide the downwardly moving body of glass into a pair of streams, one stream being supplied to each pass and rolled to sheet form.

The apparatus above described is preferably, though not necessarily, utilized in the forming of sheets or plates from pot glass or, in other words, glass which has been melted and refined within a pot while maintained in a substantially quiescent state. The use of pot glass is desirable in that it is ordinarily of the best quality. Therefore, in operating the construction herein illustrated, a pot 30 containing a mass of completely refined and settled glass is placed above the rolls 10 and 11 and tilted so as to empty the glass 29 between said rolls or within the pocket 28. As the body of glass is poured within the pocket, the several rolls are driven in the directions indicated by the arrows in Fig. 1 so that the glass is moved downwardly between the rolls and supplied to the sheet forming passes 31 and 32. As the glass is moved through the passes, it is reduced to sheet form, the sheets 45 and 46 issuing from between the rolls 10, 26 and 11, 27 respectively being supported upon a plurality of rolls 47 and 48 and carried into and through the annealing leers 49 and 50.

Any suitable conveying means for the sheets can be utilized and the glass can be carried away from the sheet forming mechanism and through the leers in any desired manner. For example, the glass sheets may be rolled out at a relatively high rate of speed and after the sheets have been formed, their speed of travel may be reduced either in the leers or before they reach the leers whereby said sheets will be carried through the leers at a relatively slower speed than the speed of formation thereof. After an entire potful of glass has been poured and rolled into sheets, the pocket 28 created by the rolls may be cleaned or another potful may be emptied into the pocket before the mass from the preceding pot has been entirely removed, thereby creating a continuous operation.

It will be apparent that as the glass is passed downwardly through the pocket to the sheet forming passes, the rolls 10 and 11 will treat opposite surfaces of the body of glass in the same manner. The cooling means circulated through the rolls prevents the rolls from overheating upon contact of the molten glass therewith while the heating means 12' heat the outer surfaces of said rolls and maintain them at the desired temperature. Also, the rolls maintain the glass in constant motion and facilitate the movement thereof to the sheet forming passes. That is, the rolls 10 and 11 and likewise the rolls 26 and 27 function to keep continuously in motion that portion of the glass contacting with the surfaces thereof in order to prevent uneven chilling of the glass. This glass is kept moving at all times so as to prevent the same from contacting with and laying stagnant for a considerable length of time on a surface which would rapidly absorb heat from the glass and chill the same. All of the advantages of the apparatus hereinabove described tend to result in the production of sheets or plates or glass of an improved quality.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for forming sheet glass, a pair of rotatable rolls horizontally spaced from one another to create a relatively narrow vertically elongated passage therebetween for receiving molten glass therein, means for internally cooling said rolls, means for heating the outer surfaces of the rolls at a point substantially opposite the point of contact of the molten glass therewith, and a pair of relatively smaller rolls arranged beneath the first-mentioned rolls and forming a bottom for said passage, said second-named rolls being spaced from said first-mentioned rolls to create sheet forming passes therebetween.

2. In apparatus for forming sheet glass, a pair of rotatable rolls horizontally spaced from one another to create a relatively narrow vertically elongated passage therebetween for receiving molten glass therein, a pair of relatively smaller rolls arranged beneath the first-mentioned rolls and forming a bottom for said passage, said second-named rolls being spaced from said first-mentioned rolls to create sheet forming passes therebetween, means for internally cooling each of said first and second mentioned rolls, and means for heating the outer surface of each roll at a point substantially opposite the point of contact of the molten glass therewith.

3. In apparatus for forming sheet glass, a pair of relatively large rotatable rolls spaced horizontally from one another to create a relatively narrow vertically elongated passage therebetween, a pair of relatively smaller rolls arranged beneath the first-mentioned rolls and forming a bottom for said passage, said second-named rolls being spaced from said first-mentioned rolls to create sheet forming passes therebetween, yieldable means for normally urging one of the first-mentioned rolls horizontally toward the other roll, and yieldable means for normally urging the second-mentioned rolls upwardly toward the first-mentioned rolls.

4. In apparatus for forming sheet glass, a pair of relatively large rotatable rolls spaced horizontally from one another to create a relatively narrow vertically elongated passage therebetween, a pair of relatively smaller rolls arranged beneath the first-mentioned rolls and forming a bottom for said passage, said second-named rolls being spaced from said first-mentioned rolls to create sheet forming passes therebetween, yieldable means for normally urging one of the first-mentioned rolls horizontally toward the other roll, yieldable means for normally urging the second-mentioned rolls upwardly toward the first-mentioned rolls, and common drive means for all of said rolls.

Signed at Toledo, in the county of Lucas and State of Ohio, this 8th day of October, 1928.

JOHN L. DRAKE.